United States Patent [19]

Meiller et al.

[11] Patent Number: 5,487,589

[45] Date of Patent: Jan. 30, 1996

[54] VEHICLE SEAT

[75] Inventors: Hermann Meiller, Amberg; Wolfgang Beier, Rieden, both of Germany

[73] Assignee: Grammer AG, Amberg, Germany

[21] Appl. No.: 376,780

[22] Filed: Jan. 23, 1995

[30] Foreign Application Priority Data

Jan. 26, 1994 [DE] Germany .................. 44 02 170.4

[51] Int. Cl.$^6$ .................. A47C 1/023; A47C 1/026
[52] U.S. Cl. .................. 297/342; 297/317; 297/320; 297/344.13; 297/313
[58] Field of Search .................. 297/320, 317, 297/311, 337, 342, 343, 344.13

[56] References Cited

U.S. PATENT DOCUMENTS

| | | | |
|---|---|---|---|
| 1,802,608 | 4/1931 | Kranse | 297/343 |
| 2,285,112 | 6/1942 | Dorton | 297/343 |
| 2,627,898 | 2/1953 | Jackson | 297/342 |
| 2,799,323 | 7/1957 | Berg | 297/312 |
| 3,022,975 | 2/1962 | Horton et al. | 297/344.13 |
| 5,037,155 | 8/1991 | Holm et al. | 296/65.1 |

FOREIGN PATENT DOCUMENTS 0665375  1/1952  United Kingdom .................. 297/343

Primary Examiner—Peter M. Cuomo
Assistant Examiner—Anthony D. Barfield
Attorney, Agent, or Firm—Elliot M. Olstein; Raymond J. Lillie

[57] ABSTRACT

A vehicle seat comprises a seat plate, a backrest pivotably movably connected to the seat plate, and an L-shaped base formed by a horizontal portion on which the seat plate is disposed and a vertical portion on which the backrest is mounted. The seat plate is provided at the underside of its front edge with retaining members which are spaced from each other in the longitudinal direct ion of the seat. The horizontal portion carries a stationary mounting support having a further retaining member for selective latching engagement with a retaining member on the seat plate, to secure the seat plate in an adjusted position on the horizontal portion of the base. Projecting from the underside of the seat plate are spring elements which are spaced from each other in the transverse direction of the seat and which slidably movably bear on the horizontal portion of the base by way of sliding shoes.

5 Claims, 2 Drawing Sheets 5,487,589

VEHICLE SEAT

BACKGROUND OF THE INVENTION

A form of vehicle seat which is typically used in tractors, trucks and the like has a base structure of a generally L-shaped configuration, with a horizontal portion which is fixed to the floor of the vehicle and a generally vertical portion extending upwardly from the horizontal portion. The seat has a seat plate which is arranged on the horizontal portion of the base structure and a backrest portion which is pivotably movably connected to the seat plate and which is mounted on the vertical portion of the base structure. At its underside the seat plate is provided with retaining members which are disposed at a spacing from each other, in the longitudinal direction of the seat, that is to say in the fore-and-aft direction. The horizontal portion of the base structure carries a stationary support mounting affording a further retaining member for latching engagement with one of the retaining members on the underside of the seat plate. It is found however that vehicle seats of that kind are of a more or less complicated design configuration, and that in turn has a detrimental effect on the manufacturing costs thereof.

A vehicle seat of that general design configuration is to be found in DE 39 29 432 Al. The seat has a spring assembly disposed between the backrest portion and the vertical portion of the L-shaped base structure. The spring assembly is disposed at that location because it is there that there is sufficient space for the spring assembly which, for reasons related to the springing action, may not be less than a given length.

In this general context also mention may be made of U.S. patent specification No 5 037 155 in which a vehicle seat has spring members disposed beneath a seat plate of the seat, but that seat does not have a generally L-shaped base structure nor does it involve a backrest which is pivotably connected to the seat plate.

SUMMARY OF THE INVENTION

An object of the present invention is to provide a vehicle seat having a generally L-shaped base structure with a seat plate and backrest portion carried thereon, which provides for adjustment of the sitting posture in the seat and which is of a comparatively simple configuration.

Another object of the present invention is to provide a vehicle seat which includes adjustment of the depth of the seat and adjustment of the associated inclination of the backrest position, and in which the springing characteristic can be easily adapted to the settings of the seat.

Still another object of the present invention is to provide a sprung adjustable vehicle seat which affords easy adjustment of the seat squab and the inclination of the backrest, with corresponding modification to the springing characteristic of the seat.

In accordance with the principles of the present invention the foregoing and other objects are attained by a vehicle seat which has a seat plate means and a backrest means pivotably movably connected to the seat plate means. The seat has a generally L-shaped base means afforded by a horizontal portion which for example is fixed to the floor of the vehicle in which the seat is used, and a vertical portion extending upwardly from the horizontal portion. The seat plate means is arranged above the horizontal portion and the backrest means is mounted on the vertical portion of the base means.

At its underside the seat plate means has retaining members which are disposed at spacings from each other in the longitudinal direction of the seat, at the front edge portion of the seat plate means. A stationary mounting support is carried on the horizontal portion of the base means and has a retaining member for latching engagement with a respective one of the retaining members on the underside of the seat plate means. Projecting from the underside of the seat plate means are spring elements disposed in spaced relationship in the transverse direction of the seat and which are supported on the horizontal portion of the base means. Each spring element which is disposed at the rearward portion of the seat plate has a sliding shoe with which it is slidably movably supported on the horizontal portion of the base means.

The retaining members on the seat plate means make it possible to provide for adjustment of the seat plate means in the longitudinal direction of the seat, in a stepwise manner corresponding to the spacing between the respective retaining members. That therefore adjusts the depth of the seat squab in accordance with the fore-and-aft movement of the seat plate means relative to the base means. Each of those seat depth settings corresponds to a respective associated setting of the inclination of the backrest portion of the seat, an increase in the depth of the seat squab corresponding to a reduction in the inclination of the backrest angle and vice-versa. At the same time, with each increase in the seat depth, there is a corresponding reduction in the spacing between the spring elements and the stationary mounting support on the horizontal portion of the base means, and consequently an increase in the degree of hardness or stiffness of the springing action of the seat plate means relative to the base means.

The fact that the vehicle seat according to the invention provides that the retaining members are disposed at the front edge portion of the seat plate means and the spring elements are disposed at the rearward portion of the seat plate means affords the advantage that the seat plate means can be raised at its front edge portion in order to disengage the latching connection between the retaining member on the underside of the seat plate means and the co-operating retaining member of the mounting support on the base means so that then the seat plate means can be displaced as desired in the longitudinal direction of the seat relative to the base means or more particularly the horizontal portion thereof. As the spring elements which are spaced from each other in the transverse direction of the seat project away from the underside of the seat plate means, they are also involved in any movement of the seat plate means in the longitudinal direction of the seat, thereby providing for corresponding modification in the springing characteristic of the seat plate means.

It will be noted that displaceability or adjustability of the seat plate means in the longitudinal direction of the seat relative to the base means of the seat and consequently adjustability of the angle of inclination of the backrest portion of the seat is advantageously not adversely affected by the spring elements for the reason that, in accordance with the present invention, each spring element has a sliding shoe by way of which it slidably bears against the horizontal portion of the base means. In that arrangement the horizontal portion may be provided with linear guide means along which the sliding shoes are linearly movably guided, together with the associated spring elements.

In accordance with a preferred feature of the invention the stationary mounting support has first and second support elements which are spaced from each other in the transverse direction of the seat. That gives a mechanically stable design structure for the vehicle seat according to the invention.

In another preferred feature of the invention the spring elements are preferably in the form of coil compression springs. The use of such springs affords the advantage that the seat still remains limitedly usable, even after a compression coil spring has broken or failed in some other fashion. Breakage of a spring element cannot be reliably excluded, in particular after a vehicle seat according to the invention has been in operation over a very long period of time. A further advantage of a vehicle seat of such a design configuration lies in its repair-friendliness because it is easily possible for a spring element to be replaced if required by a new and sound spring element.

Further objects, features and advantages of the invention will be apparent from the following description of a preferred embodiment.

DESCRIPTION OF THE PREFERRED

Figure 1:
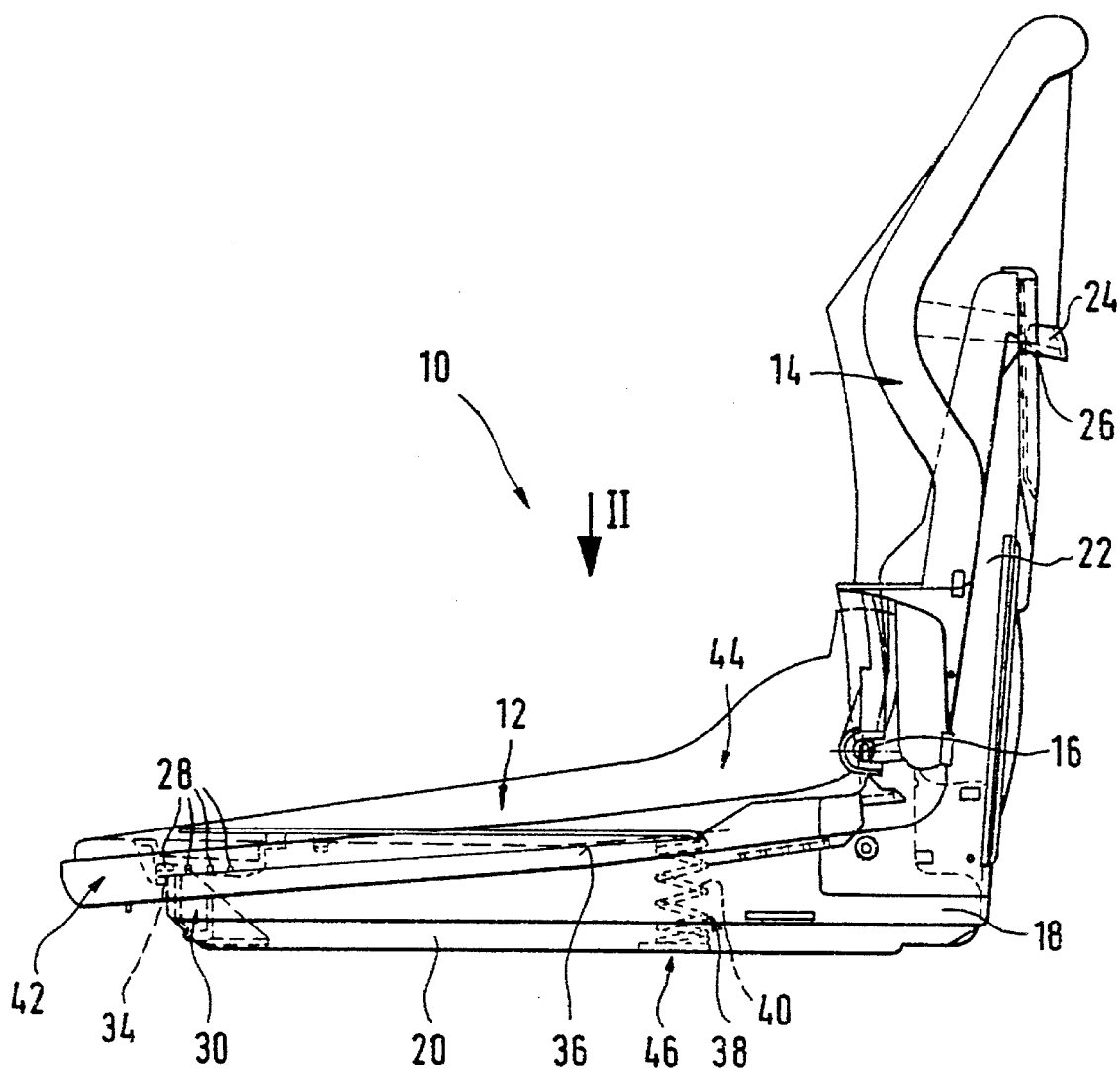
FIG. 1 is a side view of a vehicle seat according to the invention.
Figure 2:
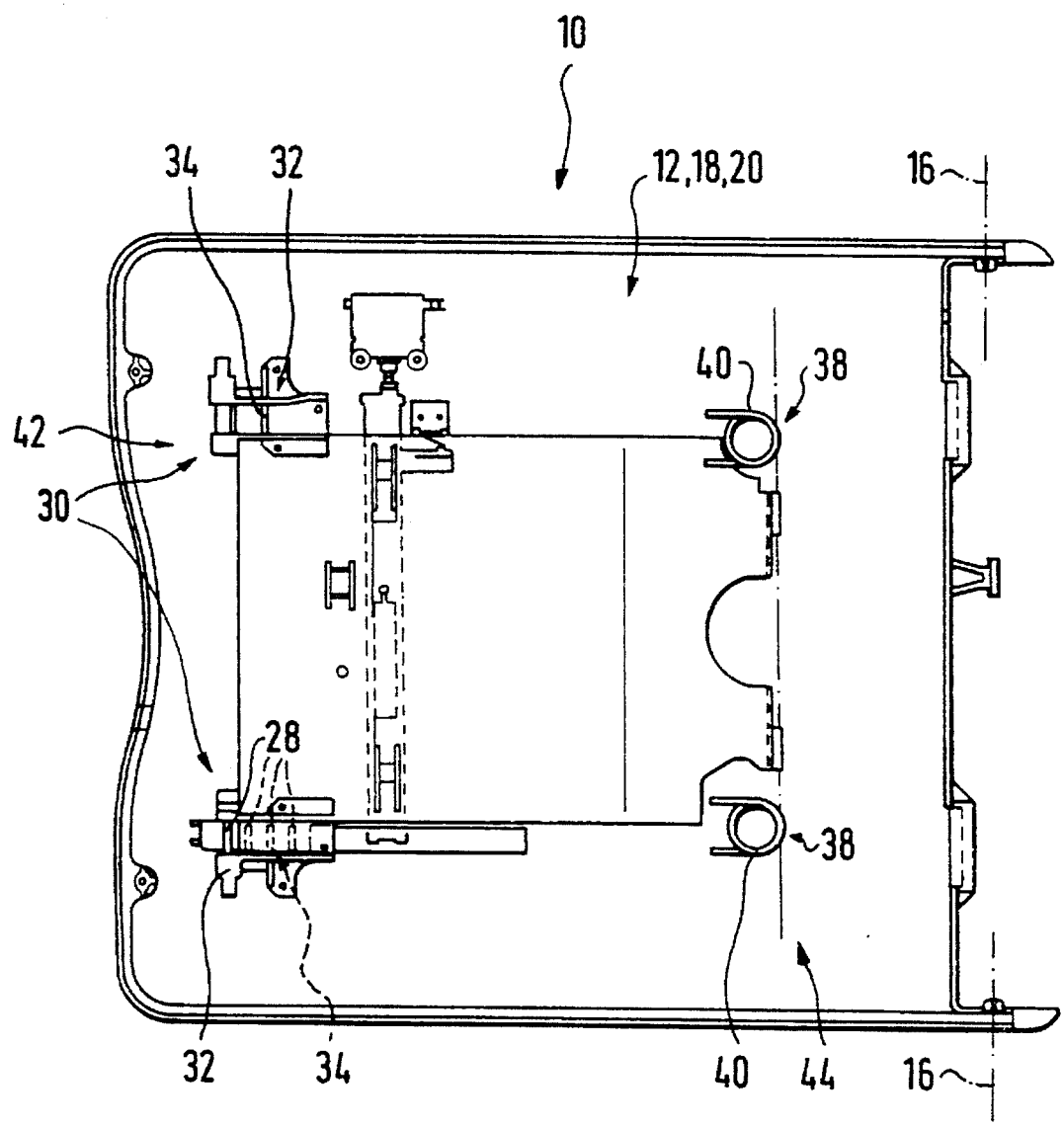
FIG. 2 is a plan view in the direction of the arrow II in FIG. 1 of the seat plate and the horizontal portion of the base means of the seat shown in FIG. 1.

It will be noted at this point that FIGS. 1 and 2 show the basic structure of the seat according to the present invention and therefore do not illustrate any upholstery or cushioning which is usually to be included on the seat plate and the backrest portion of the illustrated seat.

Referring firstly to FIG. 1, shown therein is a vehicle seat as indicated generally by reference numeral 10, comprising a seat plate 12 and a backrest portion 14 which is connected to the seat plate 12 pivotably movably about a common pivot axis 16. The vehicle seat 10 further includes a base means 18 of a generally L-shaped structure as looking at the seat in a side view, the base means 18 thus having a first portion 20 which in the position of use of the seat extends at least substantially horizontally, for example being secured to the floor of a vehicle (not shown) by suitable means (also not shown), and a second portion 22 which in said position of use of the vehicle seat extends at least substantially vertically and which thus projects upwardly from the horizontal portion 20 at the rearward edge thereof. The seat plate 12 is disposed above the horizontal portion 20, as can be clearly seen from FIG. 1, while the backrest portion 14 is pivotably movably and possibly releasably mounted by a mounting portion 24 on an upper mounting edge 26 of the vertical portion 22 of the base means 18.

On its underside the seat plate 12 is provided with a plurality of retaining members 28 which are disposed in mutually spaced relationship in the longitudinal direction of the seat, that is to say in the fore-and-aft direction thereof. The horizontal portion 20 of the base means 18 also carries an upwardly projecting stationary mounting support 30 which, as can be clearly seen from FIG. 2, comprises first and second support elements 32 which are spaced from each other in the transverse direction of the seat, beneath the front edge portion of the seat plate 12. At least one of the two support elements 32 is formed with a co-operating retaining member which is indicated at 34 in FIGS. 1 and 2 and is adapted for latching engagement with a respective one of the retaining members 28. It will be seen from FIG. 2 that both of the support elements 32 in this embodiment have a respective co-operating retaining member 34 co-operable with the retaining members 28 at respective sides of the seat plate 12.

Reference numeral 36 in FIG. 1 indicates the underside of the seat plate 12 of the seat. Projecting downwardly from the underside 36 of the seat plate 12 are spring elements 38 which are disposed at a spacing from each other in the transverse direction of the seat, as can be clearly seen from FIG. 2. The spring elements 38 are preferably each in the form of a respective compression coil spring as indicated at 40. It will be seen therefore that the spring elements 38 are operatively disposed between the seat plate 12 and the horizontal portion 20 of the base means 18, to provide for springing of the seat plate 12 relative to the horizontal portion 20 of the base means 18.

The retaining members 28 are disposed at the front edge portion 42 of the seat plate 12 at the underside thereof while the spring elements 38 project from the underside of the seat plate 12 at a rearward portion thereof, as indicated at 44.

It will be seen from FIG. 1 that, at its end portion which is towards the horizontal portion 20 of the base means 18, each spring element 38 has a sliding shoe 46. Each sliding shoe 46 is slidably supported on the horizontal portion 20 of the base means 18 so that the lower end portion of each spring 38 is supported by way of the sliding shoe 46 against the horizontal portion 20 of the base means 18. The sliding shoes 46 comprise a wear-resistant material with a coefficient of friction which is as low as possible.

It will be seen therefore that the position of the seat plate 12 can be adjusted by engaging appropriate ones of the retaining members 28 with the mounting support 30, thereby providing for adjustment of the seat plate 12 in the fore-and-aft direction of the seat, with at the same time a corresponding modification to the angle of inclination of the backrest portion 14. That adjustment of the seat plate 12 also changes the springing characteristic of the seat, because displacement of the seat plate 12 relative to the horizontal portion 20 of the base means 18 also changes the lever arm at which the springs 38 act, that is to say the spacing between the mounting support 30 and the location of the springs 38 where they act on the seat plate 12 at the underside thereof.

It will be appreciated that the above-described embodiment of the present invention has been set forth solely by way of example and illustration of the principles thereof and that various modifications and alterations may be made therein without thereby departing from the spirit and scope of the present invention.

What is claimed is:

1. A vehicle seat comprising: a base means having a first portion which in the position of use of the seat is at least substantially horizontal and a second portion which in said position of use of the seat is at least substantially vertical whereby the base means is of an at least substantially L-shaped configuration; a seat plate means on the first portion of the base means and having a front edge portion and a rearward portion; a backrest means pivotably movably connected to the seat plate means are mounted on the second portion of the base means; first retaining members at the underside of said seat plate means at the front edge portion thereof in spaced-apart relationship in the longitudinal direction of the seat; a stationary mounting support means on the first portion of the base means and having a co-operating retaining member for latching engagement with a corresponding first retaining member on said seat plate means; spring elements operatively disposed between said first portion of the base means and said seat plate means at the rearward portion thereof and spaced from each other in the transverse direction of the seat; and a sliding shoe for each spring element, each sliding shoe being slidably movably supported on said first portion of the base means to provide support for the respective spring element against said first portion of the base means.

2. A seat as set forth in claim 1 wherein said mounting support means comprises first and second support portions spaced from each other in the transverse direction of the seat.

3. A seat as set forth in claim 1 wherein said spring elements are each in the form of a coil compression spring.

4. A vehicle seat comprising: a base means having a first portion which in the position of use of the seat is at least substantially horizontal and a second portion which in said position of use of the seat is at least substantially vertical whereby the base means is of an at least substantially L-shaped configuration in side view of the seat; a seat plate means disposed above the first portion of the base means and having a front edge portion and a rearward portion; a backrest means pivotably connected to the seat plate means and mounted on said second portion of the base means; a plurality of retaining means on the underside of said seat plate means at said front edge portion thereof in spaced-apart relationship in the longitudinal direction of the seat; a mounting means on said first portion of said base means and having a retaining member selectively co-operable with said retaining means for securing the seat plate means in an adjustable position relative to said first portion of said base means in the longitudinal direction of the seat; a plurality of compression coil springs operatively disposed between said rearward portion of said seat plate means and said first portion of said base means and spaced from each other in the transverse direction of the seat; and a plurality of sliding shoes slidably carried on said first portion of said base means and each supporting the associated end of the respective compression coil spring, the arrangement being such that the rearward portion of said seat plate means is sprung relative to said first portion of said base means by said compression coil springs bearing against said first portion of said base means by way of said sliding shoes.

5. A vehicle seat comprising: a base means having a first portion which in the position of use of the seat is at least substantially horizontal and a second portion which in said position of use of the seat is at least substantially vertical whereby the base means is of an at least substantially L-shaped configuration in side view of the seat; a seat plate means on the first portion of the base means and having a front edge portion and a rearward portion; a backrest means pivotably movably connected to the seat plate means and mounted on the second portion of the base means; a retaining assembly comprising first retaining means at the underside of said seat plate means at the front edge portion thereof and second retaining means on the first portion of the base means and adapted for selective latching engagement with the first retaining means on said seat plate means for securing said front edge portion of said seat plate means in an adjustable position relative to said first portion of said base means; spring elements operatively disposed between said first portion of the base means and said seat plate means at the rearward portion thereof and spaced from each other in the transverse direction of the seat; and a sliding shoe for each spring element, each sliding shoe being slidably movably supported on said first portion of the base means to provide support for the respective spring element against said first portion of the base means.

\* \* \* \* \*